(12) United States Patent
Kodama

(10) Patent No.: US 7,865,476 B2
(45) Date of Patent: Jan. 4, 2011

(54) FILE SHARING SYSTEM IN COOPERATION WITH A SEARCH ENGINE

(75) Inventor: Shoji Kodama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 376 days.

(21) Appl. No.: 12/068,091

(22) Filed: Feb. 1, 2008

(65) Prior Publication Data
US 2009/0112881 A1 Apr. 30, 2009

(30) Foreign Application Priority Data
Oct. 30, 2007 (JP) ............................ 2007-281803

(51) Int. Cl.
G06F 17/30 (2006.01)
(52) U.S. Cl. .................. 707/674; 707/678; 707/679; 707/680; 707/681; 707/640
(58) Field of Classification Search ................ 707/661, 707/662, 663, 665, 666, 674, 678, 681, 675, 707/676, 679, 680
See application file for complete search history.

(56) References Cited

U.S. PATENT DOCUMENTS 5,758,359 A * 5/1998 Saxon .............................. 1/1
6,415,285 B1 7/2002 Kitajima et al.
6,651,077 B1 * 11/2003 East et al. ........................ 1/1
(Continued)

FOREIGN PATENT DOCUMENTS
JP 07-085072 9/1993
(Continued)

OTHER PUBLICATIONS

"Spotlight: Find Anything on Your Mac Instantly", Technology Brief, http://images.apple.com/jp/macosx/pdf/MacOSX_Spotlight_TB.pdf., pp. 1-16.
(Continued)

*Primary Examiner*—Jean M Corrielus
(74) *Attorney, Agent, or Firm*—Volpe and Koenig, P.C.

(57) ABSTRACT

Provided is a computer system including: a client computer; a storage system coupled to the client computer via a network; a folder deciding module; and a file storage module, in which each of a plurality of files is stored in one of a plurality of folders; the client computer receives an instruction to store a file; the folder deciding module judges how strongly the plurality of folders are each related to the designated file based on a matching degree between each of the plurality of files stored in the plurality of folders and the designated file; and the file storage module stores the designated file in one of the plurality of folders that has been judged to be most strongly related to the designated file. According to this invention, a created file is stored in a suitable folder so that the file can easily be found by the user.

18 Claims, 15 Drawing Sheets

U.S. PATENT DOCUMENTS

| | | | |
|---|---|---|---|
| 7,152,080 B2 * | 12/2006 | Mikami | 1/1 |
| 7,197,520 B1 * | 3/2007 | Matthews et al. | 1/1 |
| 7,225,208 B2 * | 5/2007 | Midgley et al. | 1/1 |
| 7,657,720 B2 * | 2/2010 | Otani | 711/162 |
| 7,680,830 B1 * | 3/2010 | Ohr et al. | 707/999.2 |
| 7,761,456 B1 * | 7/2010 | Cram et al. | 707/754 |
| 2005/0076070 A1 * | 4/2005 | Mikami | 707/204 |
| 2007/0220319 A1 * | 9/2007 | Desai et al. | 714/13 |
| 2008/0059733 A1 * | 3/2008 | Otani | 711/162 |
| 2008/0320219 A1 * | 12/2008 | Okada et al. | 711/114 |
| 2010/0058012 A1 * | 3/2010 | Okada et al. | 711/162 |
| 2010/0058015 A1 * | 3/2010 | Tokoro | 711/162 |

FOREIGN PATENT DOCUMENTS

| | | |
|---|---|---|
| JP | 2000-172711 | 12/1998 |

OTHER PUBLICATIONS

"Finger. Give Your Files the Rock Star Treatment", Apple-Mac OS X, http://www.apple.com/jp/macosx/features/finger.html, 2 pages.

* cited by examiner

0116

| FILE SERVER NAME | FOLDER NAME | FILE NAME | KEYWORD LIST |
|---|---|---|---|
| FileServerA | DirA | FileA | (HITACHI, 3), (DISK, 2) |
| FileServerA | DirA | FileB | (HITACHI, 2), (PLASMA, 3) |
| FileServerA | DirB | FileC | (IBARAKI, 5), (FRUIT, 1) |
| FileServerA | DirC | FileD | (SINGAPORE, 8) |
| FileServerB | DirD | FileE | (IBARAKI, 1), (HITACHI, 1) |
| ⋮ | ⋮ | ⋮ | ⋮ |

("OnlineStorageA" AND ("DATA LEAKAGE" OR "DATA LOSS"))

| SERVER NAME | FOLDER NAME | FILE NAME | KEYWORD COUNT |
|---|---|---|---|
| WebServerX | Blogs | Entry001 | 8 |
| WebServerX | News | News002 | 9 |

| RANKING | ONLINE STORAGE NAME | NEGATIVE KEYWORD COUNT |
|---|---|---|
| 1 | OnlineStorageB | 0 |
| 2 | OnlineStorageA | 17 |

| ONLINE STORAGE NAME | FOLDER NAME | KEYWORD APPEARANCE COUNT |
|---|---|---|
| OnlineStorageA | DirA | 5 |
| OnlineStorageB | DirB | 1 |

FILE SHARING SYSTEM IN COOPERATION WITH A SEARCH ENGINE

CLAIM OF PRIORITY

The present application claims priority from Japanese application JP2007-281803 filed on Oct. 30, 2007, the content of which is hereby incorporated by reference into this application.

BACKGROUND

A technology disclosed herein relates to a file management performed by a computer, in particular, a technique of enhancing an effect of file sharing by making it easy for as many users as possible to find newly created files in a file sharing environment in which a large volume of files are classified and stored in a plurality of file servers and folders.

For management of a large volume of files, it is important to assure "ease of finding a file" which allows a person who needs a file to find the file as necessary.

Up to now, the files have been organized by use of a concept of hierarchical grouping such as folders or directories. The folder has a human-readable name. To store a new file in a file server and share the new file with another, it is important to store the new file in a folder as related to the contents of the new file as possible in order to improve the ease of finding a file.

However, an increase in scale of a folder hierarchy due to: an increase in the number of folders; an increase in the depth of the folder hierarchy; use of a plurality of file servers in order to enhance a storage capacity; or the like causes a user to take a longer time to find a suitable folder for storing a file, which leads a problem that a work efficiency becomes worse.

Methods of solving this problem include a file search technique. For example, the file search technique makes it possible to find a necessary file by causing a search engine to search a plurality of folders for a file instead of storing files by classifying the files into folders.

According to the file search technique, the search engine server creates an index database for all files stored in a file server by extracting keywords from the files. Then, the user issues a search request with a designated keyword to the search engine server. The search engine server searches the index database, and returns a list of files that contains the keyword to the user. This allows the user to find a necessary file through the keyword search, thereby improving the ease of finding a file.

The file search technique is disclosed in, for example, JP 2000-172711 A, JP 07-085072 A, "Spotlight" (Apple Inc.) retrieved on Oct. 5, 2007 online through the Internet at the URL http://images.apple.com/jp/macosx/pdf/MacOSX_Spotlight_TB.pdf, and "Apple—Mac OS X Leopard—New Features—Finder" (Apple Inc.) retrieved on Oct. 30, 2007 online through the Internet at the URL http://www.apple-.com/jp/macosx/features/finder.html.

In JP 2000-172711 A and JP 07-085072 A, used in a state where a plurality of document databases including a search engine exist is an intermediate database for indicating relationships between search keywords and the document databases. The intermediate database transfers a search request to one of the plurality of document databases, thereby improving a search efficiency. To that end, JP 07-085072 A describes the step of subjecting a document analysis on a plurality of databases (DBs) and calculating attributes of the DBs in comparison with a dictionary. Further, JP 07-085072 A describes the step of, when a new DB is added, checking the attribute of the new DB as well and also adding the new DB to the selection target DBs (refer to the paragraphs 0046 to 0048 and FIG. 11 of JP 07-085072 A).

In "Spotlight", a plurality of files containing a previously designated search keyword are retrieved. The retrieved plurality of files are grouped into a virtual folder and listed. According to "Spotlight", it is possible to find a newly created file without the need of time and labor for searching for the file.

According to "Apple—Mac OS X Leopard—New Features—Finder", search results can be saved for later use. By using prepared search keywords, further more search results can be obtained while saving time and labor.

SUMMARY

However, the search techniques disclosed in JP 2000-172711 A and JP 07-085072 A share a problem in that the user of the file server needs to take trouble to enter a search keyword for a search in order to find a necessary file.

For a user who already knows which folder a plurality of files relating to a given matter are stored in, it is higher in efficiency to create a shortcut to the folder and directly access the folder than to perform a search every time. However, the search techniques disclosed in JP 2000-172711 A and JP 07-085072 A does not allow the user who directly accesses the folder to know which folder a file should be stored in to make it easy to find the file.

According to the techniques disclosed in "Spotlight" and "Apple—Mac OS X Leopard—New Features—Finder", all files that hit the search keyword are listed in the same virtual folder. This indicates that a result from classifying the files into folders manually by a human being according to the rule other than the keyword cannot be reflected on virtual folders. In addition, the files cannot be classified manually into the virtual folders according to the rule other than the keyword. In other words, there is a problem in that the techniques disclosed in "Spotlight" and "Apple—Mac OS X Leopard—New Features—Finder" cannot be employed along with file classification operation which has conventionally been operated manually. Further, the techniques disclosed in "Spotlight" and "Apple—Mac OS X Leopard—New Features—Finder", similarly to the cases of JP 2000-172711 A and JP 07-085072 A, does not allow the user who directly accesses the folder to know which folder a file should be stored in to make it easy to find the file.

In order to solve the above-mentioned problems, an object of this invention is to provide a file sharing system in cooperation with a search engine which makes it easy for a user who directly accesses a folder to find a new file.

According to a representative invention disclosed in this application, there is provided a computer system, comprising: a client computer; a first storage system coupled to the client computer via a network; a folder deciding module; and a file storage module, the client computer comprising: a first interface coupled to the network; a first processor coupled to the first interface; and a first memory coupled to the first processor, the first storage system comprising: at least one first data storage device; and a first controller for controlling the first data storage device, wherein: the at least one first data storage device includes a plurality of data storage areas, at least one of which is associated with one of a plurality of files; each of the plurality of files is stored in one of a plurality of folders; the client computer is configured to receive an instruction to store a file; the folder deciding module is configured to judge how strongly the plurality of folders are each related to the file designated to be stored by the instruction based on a matching degree between each of the plurality of files stored in the plurality of folders and the designated file; and the file storage module is configured to store the designated file in one of the plurality of folders that has been judged to be most strongly related to the designated file.

According to the one embodiment of this invention, there can be provided the file sharing system in cooperation with a search engine in which even if a user who is to store a file does not designate the storage destination of the file, the file can be stored in a folder that is easy to be found by another user who shares the file.

BRIEF DESCRIPTION OF THE DRAWINGS

FIG. 5 is an explanatory diagram showing an example of an index database according to the first embodiment of this invention.

FIG. 15 is an explanatory diagram showing an example of a search query issued to a search engine server by a storage folder deciding module of a client file system according to the third embodiment of this invention.

FIG. 16 is an explanatory diagram showing an example of a search result returned to the client file system from the search engine server according to the third embodiment of this invention.

FIG. 17 is an explanatory diagram showing an example of a ranking table that is created, for creating a ranking of popularity of online storages, by a storage folder search module of the client file system according to the third embodiment of this invention.

FIG. 18 is an explanatory diagram showing an example of a table for managing an appearance count of a representative keyword for each folder, which is created by the storage folder deciding module of the client file system according to the third embodiment of this invention.

DETAILED DESCRIPTION OF THE PREFERRED EMBODIMENTS

First Embodiment

Hereinafter, description will be made of a file sharing system in cooperation with a search engine according to a first embodiment of this invention with reference to the drawings.

Figure 1:
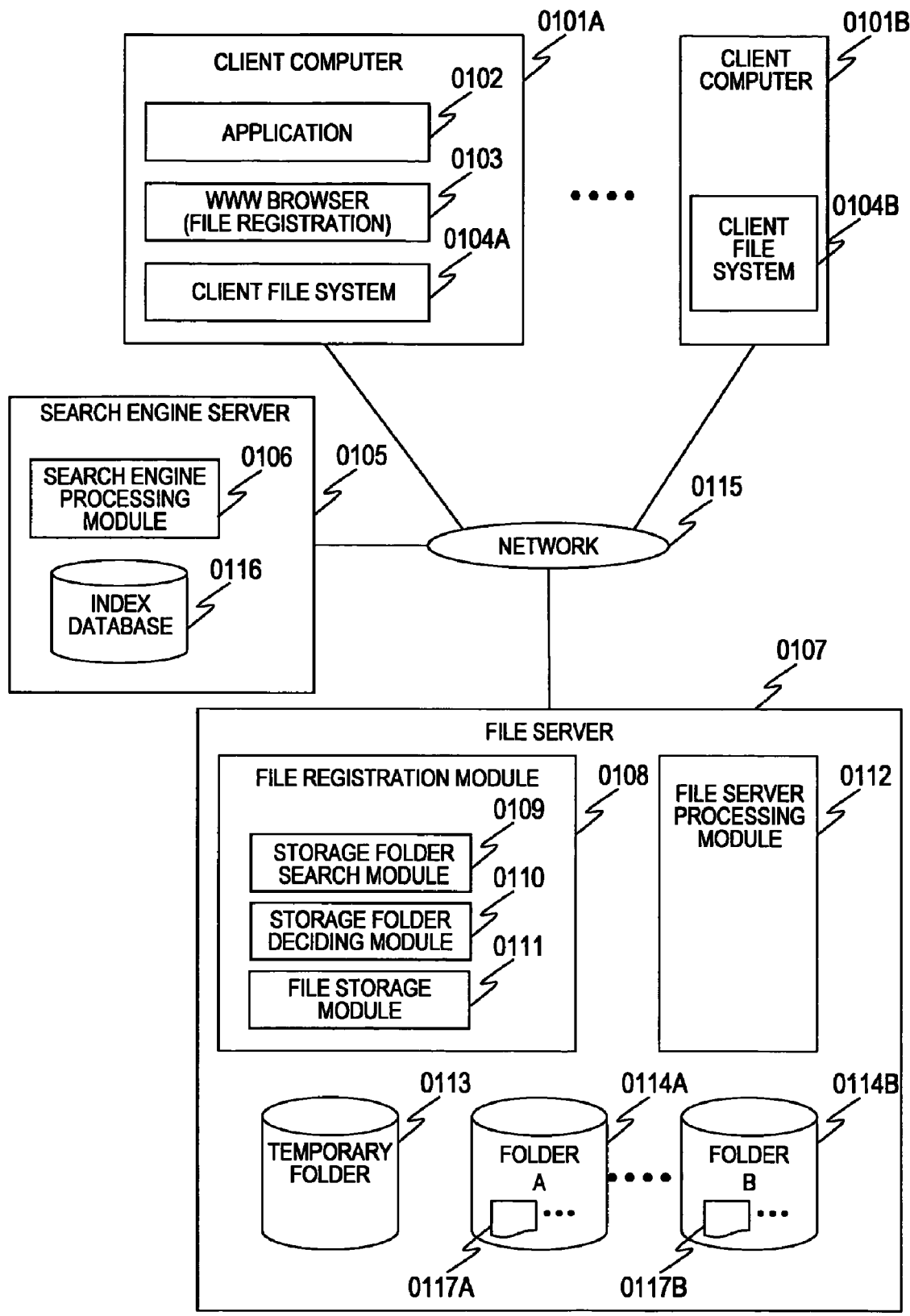
FIG. 1 is a block diagram showing a schematic configuration of a file sharing system in cooperation with a search engine according to a first embodiment of this invention.

FIG. 1 is a block diagram showing a schematic configuration of the file sharing system in cooperation with a search engine according to the first embodiment of this invention.

This system represents a computer system including one or more client computers 0101A and 0101B, at least one search engine server 0105, at least one file server 0107, and a network 0115 for coupling those components. Ethernet or the Internet can be used as the network 0115. TCP/IP, for example, may be used as a communication protocol for the network 0115.

The client computers 0101A and 0101B represent computers that are used by end users. To be specific, the client computers 0101A and 0101B each store a newly created file in the file server 0107, and each reference/update the file stored in the file server 0107.

Operated on the client computer 0101A are applications 0102 for creating, referencing, updating, and deleting a file, a WWW browser 0103 for registering a file into the file server 0107, and a client file system 0104A for making a request for access to a file within the file server 0107 by communicating with the file server 0107.

Operated on the client computer 0101B is a client file system 0104B for making a request for access to a file within the file server 0107.

The client computers 0101A and 0101B each further include basic computer software components such as an operating system and a graphical user interface. However, those components are not essential to the description of this embodiment, so their drawings and descriptions will be omitted.

The configuration of FIG. 1 shows an example state where the client computer 0101A registers a file 0117A or the like into any one of folders 0114A or the like of the file server 0107 (in other words, stores file 0117A or the like to be included in any one of folders 0114A), and the client computer 0101B directly accesses the file 0117A or the like within the folder 0114A or the like.

A search engine processing module 0106 operating on the search engine server 0105 creates an index database 0116 or the like of all files 0117A or the like stored in the file server 0107. Then, upon reception of a file search request issued from another computer, the search engine processing module 0106 searches for the files 0117A or the like containing the search keyword designated by the file search request, and returns a list of the retrieved files 0117A or the like to the request source computer. The search engine processing module 0106 can be implemented by a known technique that is already disclosed, so its detailed description will be omitted.

The file server 0107 of FIG. 1 stores the file 0117A or the like created by the end user, and according to the request from the client file systems 0104A and 0104B, executes the processing of creating/referencing/updating/deleting the file 0117A or the like. The file server 0107 may be implemented by a storage system such as a so-called network attached storage (NAS).

In the first embodiment, the file server 0107 includes a file registration module 0108, a file server processing module 0112, a temporary folder 0113, and one or more folders 0114A and 0114B.

Each folder is assigned with a human-readable name, and stores a given number of files. In the example of FIG. 1, the files 0117A and 0117B are stored in the folders 0114A and 0114B, respectively.

It should be noted that in the description of embodiments of this invention, the term "folder" represents a generic concept of a group that includes at least one file. For example, the "folder" according to the embodiments of this invention may be a folder on a Windows system or a directory on a UNIX system.

Upon reception of a file registration request from the WWW browser 0103 of the client computer 0101A, the file registration module 0108 searches for the folder 0114A that strongly relates to the file 0117A or the like whose registration has been requested. For example, the file registration module 0108 judges how strongly the requested file 0117A or the like relates to the folder 0114A or the like based on a matching degree between the requested file 0117A or the like and each file 0117A or the like within the folder 0114A or the like. Then the file registration module 0108 stores the file 0117A or the like in the retrieved folder 0114A or the like.

For the above-mentioned processing, the file registration module 0108 includes a storage folder search module 0109, a storage folder deciding module 0110, and a file storage module 0111.

According to the request from the client file systems 0104A and 0104B, the file server processing module 0112 executes the processing of creating/referencing/updating/deleting the file 0117A or the like. The file server processing module 0112 and the client file systems 0104A and 0104B can be implemented by a known technique that is already disclosed, so its detailed description will be omitted. For example, a network file system (NFS) can be used as a file sharing protocol used between the file server 0107 and the client file systems 0104A and 0104B.

The temporary folder 0113 represents a storage area for storing the file 0117A or the like that has been transmitted by the WWW browser 0103 temporarily until the folder 0114A or the like for storing the file 0117A or the like is decided.

Hereinafter, to describe the client computers 0101A and 0101B commonly to each other, the client computers 0101A and 0101B will be described generically as the client computer 0101. In a similar manner, the client file system 0104A or the like, the folder 0114A or the like, and file 0117A or the like are also described generically as the client file system 0104, the folder 0114, and the file 0117, respectively.

Figure 2:
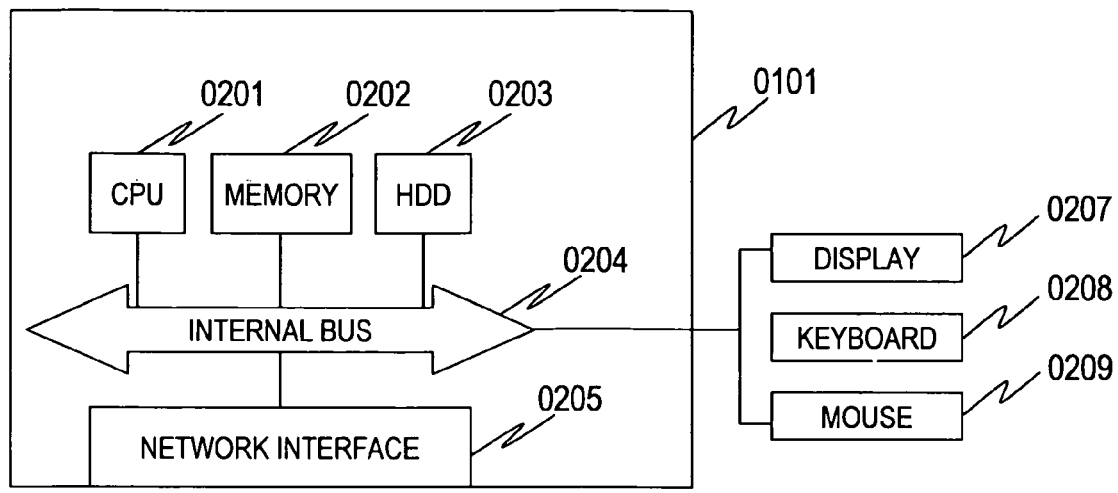
FIG. 2 is a block diagram showing a schematic configuration of hardware of client computers according to the first embodiment of this invention.

FIG. 2 is a block diagram showing a schematic configuration of hardware of the client computers 0101A and 0101B according to the first embodiment of this invention.

The hardware of the client computer 0101 includes, as its internal components, a central processing unit (CPU) 0201, a memory 0202, a hard disk drive (HDD) 0203, and a network interface 0205. Those components are coupled with one another through an internal bus 0204. Further, the client computer 0101 is coupled with a display 0207, a keyboard 0208, and a mouse 0209 which serve as user interfaces.

The client computer 0101 is coupled to the network 0115 via the network interface 0205, and communicates with the search engine server 0105 and the file server 0107.

The application 0102, the WWW browser 0103, and the client file system 0104 are implemented by the CPU 0201 executing programs stored in the memory 0202. Thus, in the following description, the processing executed by each of the above-mentioned components is actually executed by the CPU 0201. Those programs may be stored in the HDD 0203 and copied to the memory 0202 as necessary.

Figure 3:
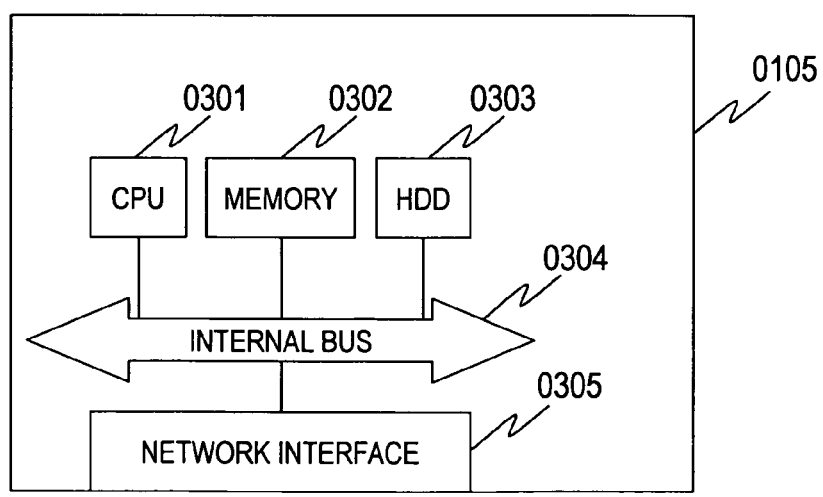
FIG. 3 is a block diagram showing a schematic configuration of hardware of a search engine server according to the first embodiment of this invention.

FIG. 3 is a block diagram showing a schematic configuration of hardware of the search engine server 0105 according to the first embodiment of this invention.

The hardware of the search engine server 0105 includes, as its internal components, a CPU 0301, a memory 0302, an HDD 0303, and a network interface 0305. Those components are coupled to one another through an internal bus 0304.

The search engine server 0105 is coupled to the network 0115 via the network interface 0305, and communicates with the client computer 0101 and the file server 0107.

The search engine processing module 0106 is implemented by the CPU 0301 executing programs stored in the memory 0302. Thus, in this embodiment, the processing executed by the search engine processing module 0106 is actually executed by the CPU 0301. Those programs may be stored in the HDD 0303 and copied to the memory 0302 as necessary.

The index database 0116 is stored in the HDD 0303. A part of the index database 0116 may be copied to the memory 0302 as necessary.

Figure 4:
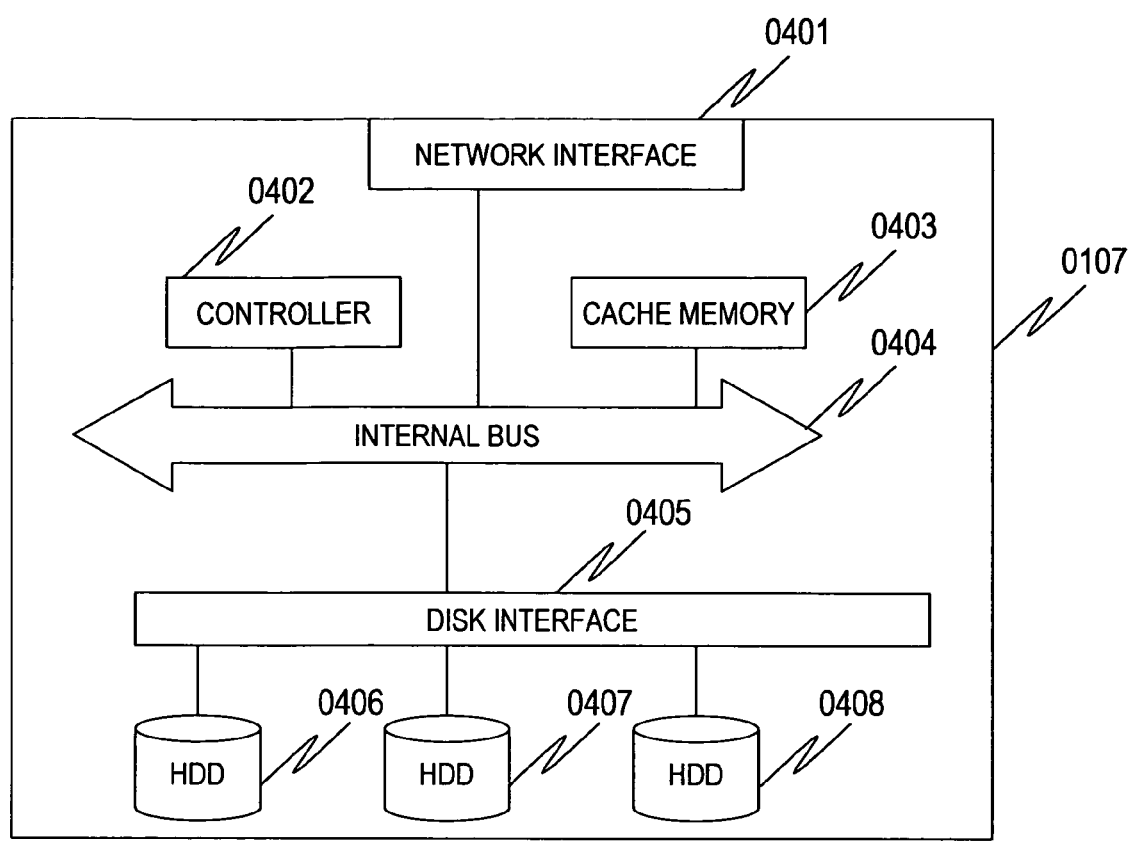
FIG. 4 is a block diagram showing a schematic configuration of hardware of a file server according to the first embodiment of this invention.

FIG. 4 is a block diagram showing a schematic configuration of hardware of the file server 0107 according to the first embodiment of this invention.

The hardware of the file server 0107 includes a network interface 0401, a controller 0402, a cache memory 0403, a disk interface 0405, and one or more HDDs 0406, 0407, and 0408. Those components other than the HDD 0406 or the like are coupled to an internal bus 0404. The HDD 0406 or the like is coupled to the disk interface 0405.

The file server 0107 is coupled to the network 0115 via the network interface 0401, and communicates with the client computer 0101 and the search engine server 0105.

The HDD 0406 or the like includes a plurality of data storage areas for storing data of the file 0117 written by the client computer 0101. A correlation between the file 0117 written by the client computer 0101 and the data storage area in which the data of the file 0117 is stored is managed by the file server processing module 0112.

For example, one or more storage areas included in the HDD 0406 or the like may be associated with the file 0117A within the folder 0114A, another one or more storage areas may be associated with the file 0117B within the folder 0114B, and further another one or more storage areas may be associated with a file (not shown) within the temporary folder 0113. In this case, the controller 0402 of the file server 0107, which has received a request to write any one of the files 0117, stores data of the requested file 0117 in the storage area associated with the file 0117.

The file registration module 0108 and the storage folder search module 0109, the storage folder deciding module 0110, and the file storage module 0111 that are included in the file registration module 0108 are implemented by the controller 0402. For example, each of the above-mentioned modules may be implemented by a CPU (not shown) within the controller 0402 executing a program stored in a memory (not shown) within the controller 0402. Thus, in the embodiments of this invention, the processing executed by each of the above-mentioned modules is actually executed by the controller 0402.

FIG. 5 is an explanatory diagram showing an example of the index database 0116 according to the first embodiment of this invention.

The index database 0116 manages information relating to location information on the file 0117 and the contents of the file 0117 in the form of table with respect to each of the files 0117 stored in the file server 0107.

To be specific, managed as the location information on the file 0117 are a file server name 0502, a folder name 0503, and a file name 0504. The file server name 0502 represents identification information of the file server 0107. If the computer system includes a plurality of file servers 0107, to uniquely identify each of the files 0117 within the computer system, the file server name 0502 needs to be used in addition to the file name 0504. The folder name 0503 represents identification information of the folder 0114 that stores the file 0117. The file name 0504 represents identification information of the file 0117.

Managed as the information relating to the file 0117 is a keyword list 0505. The search engine server 0105 references the contents of each of the files 0117 stored in the file server 0107 to manage the keyword list 0505 including keywords contained in the file 0117 and an appearance count of the keywords within the file 0117.

The example of FIG. 5 indicates that a file "FileA" stored in a folder "DirA" of a file server "FileServerA" contains the keywords "Hitachi" and "disk" whose appearance counts are 3 times and 2 times, respectively. The search engine server 0105 can manage a plurality of file servers 0107 in a single index database 0116.

Figure 6A:
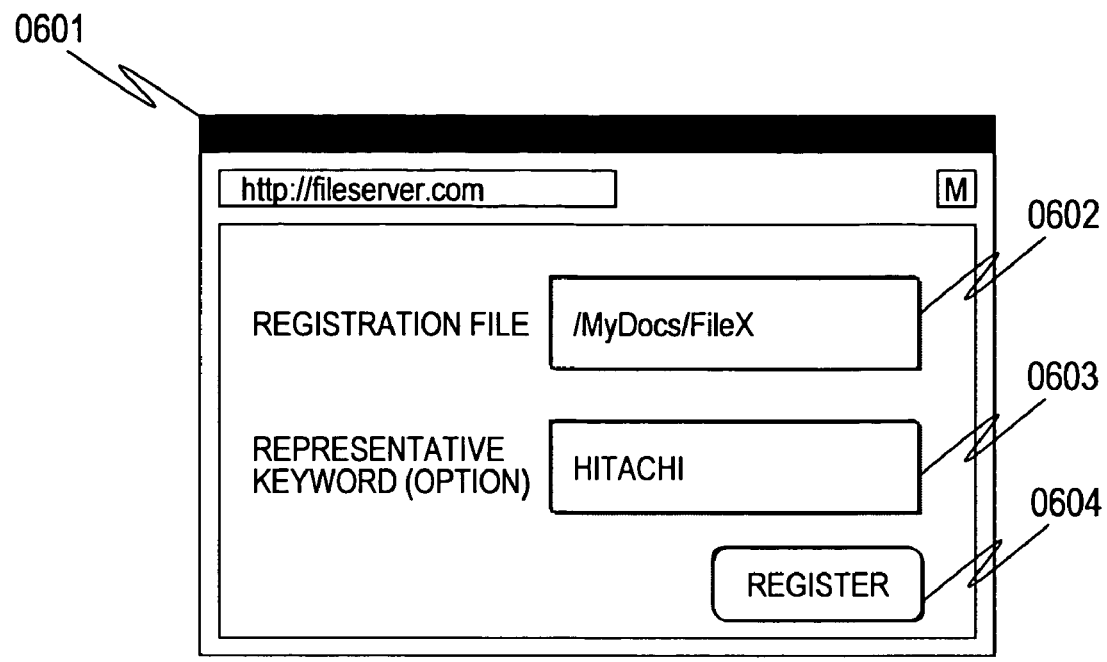
FIGS. 6A and 6B are explanatory diagrams showing examples of a user interface using a WWW browser according to the first embodiment of this invention.
Figure 6B:
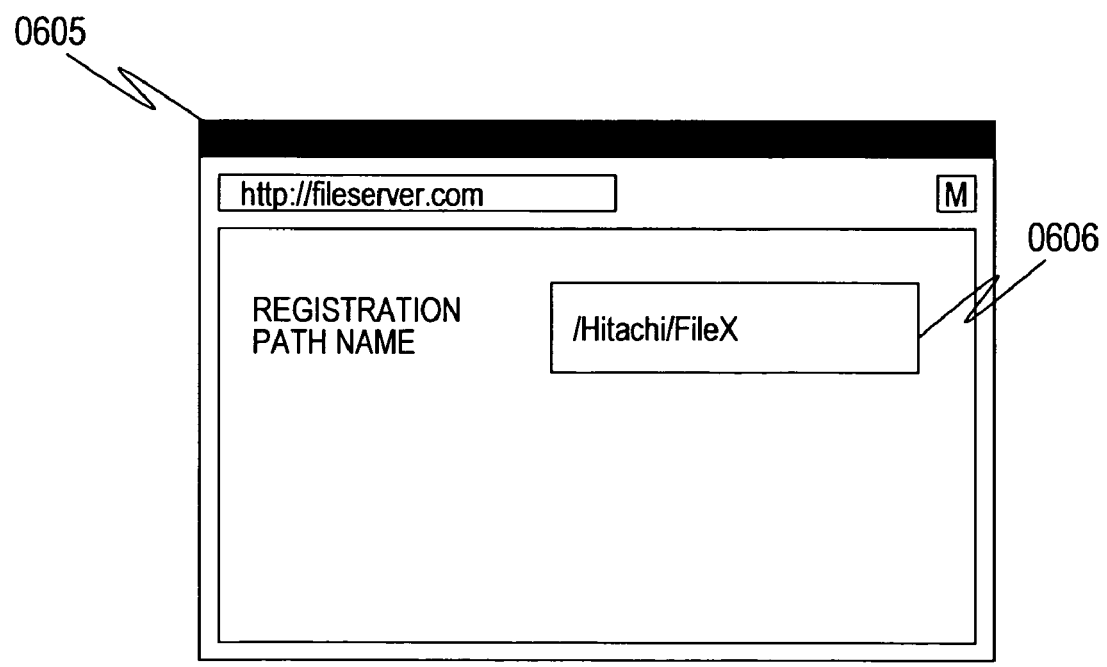

FIGS. 6A and 6B are explanatory diagrams showing examples of a user interface using the WWW browser 0103 according to the first embodiment of this invention.

A screen 0601 is used when the user stores a new file 0117 in the file server 0107. The screen 0601 includes a registration file input field 0602 and a representative keyword input field 0603.

The user can fill the registration file input field 0602 with path information within a local file system of the file 0117 that is to be stored in the file server 0107, and can further fill the representative keyword input field 0603 with the keyword that represents the file 0117. The user can decide an arbitrary keyword that appears to represent the file 0117 as the representative keyword to thereby enter the keyword.

When the user clicks on a registration button 0604 in the WWW browser 0103, a file registration request is issued to the file server 0107. Transmitted along with the file registration request are an entity of the file 0117 designated in the registration file input field 0602 and the representative keyword entered in the representative keyword input field 0603.

The example of the screen 0601 indicates that the file 0117 identified by "FileX" which is stored in the folder 0114 identified by "/MyDocs" in the local file system is registered in the file server 0107. "Hitachi" is designated as the representative keyword. The representative keyword may be not only a character string but also a search query.

It should be noted that the user does not need to enter the representative keyword in the representative keyword input field 0603. In this case, the file server 0107 decides the representative keyword (refer to Step 0707 of FIG. 7 described later).

The screen 0605 is an example of a screen for displaying a file registration result. In the first embodiment, the user stores the file 0117 in the file server 0107 through the WWW browser 0103. The folder 0114 that stores file 0117 is decided by the file server 0107. The user can learn the folder name of the folder in which the file server 0107 has stored the file 0117 from the file registration result. To be specific, the folder name of the folder that stores the file 0117 is displayed in a registration path name display field 0606.

The example of the screen 0605 indicates that the file 0117 identified by the file name "FileX" is registered in the folder 0114 identified by the folder name "/Hitachi" (in other words, the file "FileX" is stored in the folder "/Hitachi" so as to be contained therein). In an environment including a plurality of file servers 0107, the file server name of the file server to which the folder 0114 belongs is displayed in addition to the path name.

Figure 7:
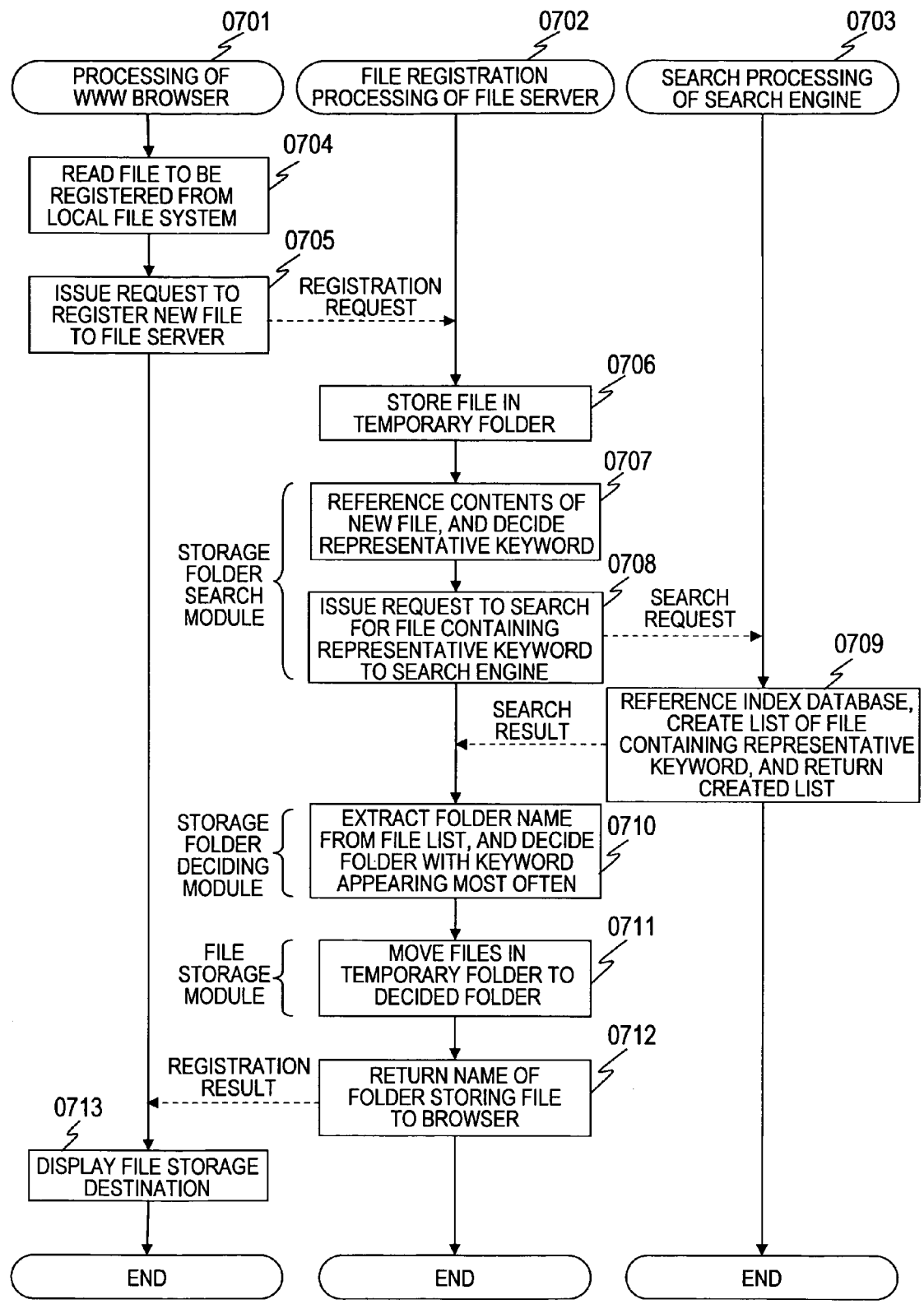
FIG. 7 is a flowchart showing processings executed when a new file is registered in the file server according to the first embodiment of this invention.

FIG. 7 is a flowchart showing processings executed when the new file 0117 is registered in the file server 0107 according to the first embodiment of this invention.

As shown in FIG. 7, a WWW browser processing 0701, a file registration processing 0702 by the file server, and the search processing 0703 by the search engine are executed when the new file 0117 is registered in the file server 0107. Those processings are started by the user clicking on the registration button 0604 of the file registration screen 0601 in the WWW browser 0103.

First, the WWW browser 0103 reads the file 0117 designated in the registration file input field 0602 in the WWW browser 0103 from the client file system 0104 of the client computer 0101 (Step 0704).

Then, the WWW browser 0103 issues a registration request for the new file 0117 (in other words, request to store the new file 0117 in the file server 0107) to the file server 0107 (Step 0705). Contained in the registration request are a request type "file registration" and the file 0117 per se as attached information. If the user designates the representative keyword through the screen in the WWW browser 0103, the representative keyword is also contained in the registration request.

The file storage module 0111 of the file server 0107, which has received the registration request, stores the file 0117 received from the client computer 0101 in the temporary folder 0113 (Step 0706).

Subsequently, the file server 0107 references the contents of the new file 0117 to decide the representative keyword to be set for the file 0117 whose registration has been requested (Step 0707). For example, to decide the representative keyword, the file server 0107 may obtain the appearance count of each keyword that appears in the file 0117, and select the keyword having the largest appearance count as the representative keyword. Alternatively, the file server 0107 may judge whether or not the appearance count of each keyword exceeds a predetermined threshold, and select one or more keywords with the appearance count exceeding the predetermined threshold as the representative keyword.

If the client computer 0101 designates the representative keyword in the registration request, this keyword is used as the representative keyword.

Then, the file server 0107 issues a search request for the file 0117 containing the representative keyword to the search engine server 0105 (Step 0708).

The search engine server 0105, which has received the search request, searches the index database 0116 for the file 0117 that contains the representative keyword designated by the search request, creates a list in which the file 0117 containing the representative keyword and the appearance count of the keyword within the file are contained as each entry, and returns a search result containing the list to the file server 0107 (Step 0709). The example of the search result will be described later with reference to FIG. 8.

The file server 0107, which has received the search result, judges how strongly the file 0117 whose registration has been requested relates to each folder 0114 based on the matching degree between the file 0117 whose registration has been requested and the file 0117 within each folder 0114. Then, the folder 0114 judged to be most strongly related to the file 0117 whose registration has been requested is decided as the storage destination of the file 0117 whose registration has been requested (Step 0710).

The appearance count of the representative keyword in each file 0117 of each folder 0114 is used as the matching degree between the file 0117 whose registration has been requested and the file 0117 within each folder 0114.

Figure 9:
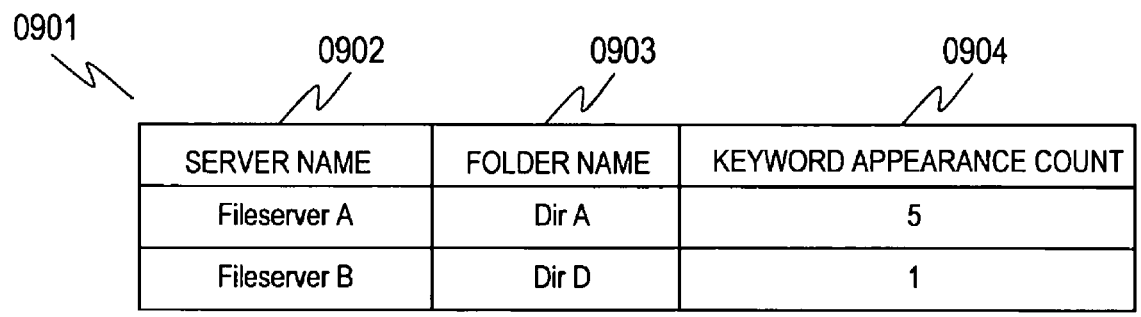
FIG. 9 is an explanatory diagram showing a result outputted from the file server of the first embodiment of this invention having sorted folders contained in the search result with a keyword that appears most often.

For example, the file server 0107 extracts the folder name from the file list of the search result, and decides the folder 0114 having the largest appearance count of the representative keyword. To be specific, the file server 0107 calculates a total sum of the appearance counts the representative keywords for all the files 0117 included in the same folder 0114. Then, the file server 0107 selects the folder 0114 having the largest total sum of the appearance counts that has been calculated as the folder 0114 that most strongly relates to the file 0117 whose registration has been requested. FIG. 9 shows an example of the result of Step 0710 thus executed.

Alternatively, based on the file list of the search result, the file server 0107 may sum up the number of files 0117 with the appearance count of the representative keyword being one or more for each folder 0114 including those files 0117. In this case, the folder 0114 having the largest number of files 0117 that has been summed up is judged to be most strongly related to the file 0117 whose registration has been requested.

Then, the file server 0107 moves the file 0117 within the temporary folder 0113 to the folder 0114 decided in Step 0710 (Step 0711). If the decided folder 0114 belongs to another file server, the file server 0107 transfers the file 0117 to the selected folder 0114 of the another file server.

Subsequently, the file server 0107 returns the folder name of the folder 0114 in which the file 0117 is finally stored to the client computer 0101 (Step 0712).

The WWW browser 0103 of the client computer 0101, which has received the folder name, displays the received folder name in the registration path name display field 0606 of the screen, and completes the processing.

Figure 8:
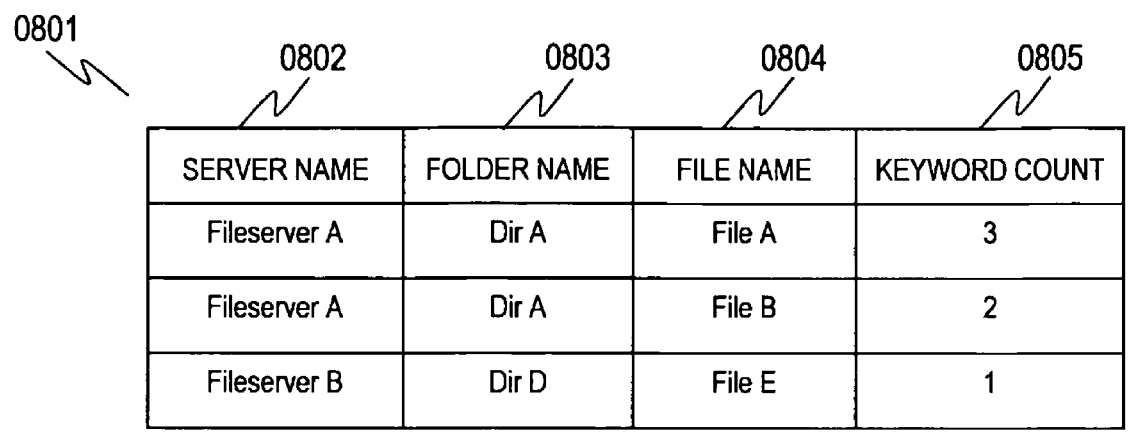
FIG. 8 is an explanatory diagram showing an example of a search result outputted from the search engine server according to the first embodiment of this invention.

FIG. 8 is an explanatory diagram showing an example of the search result outputted from the search engine server 0105 according to the first embodiment of this invention.

To be specific, FIG. 8 shows an example of the search result created and transmitted in Step 0709 of FIG. 7.

The search result 0801 represents a list of files 0117 that contain the search keyword. This example shows a server name 0802, a folder name 0803, and a file name 0804 in order to identify the file 0117. In addition, the search result 0801 contains a keyword count 0805 for indicating how many times the search keyword appears within the file 0117.

The example of FIG. 8 indicates that 3 keywords are included in the file "FileA" stored in the folder "DirA" of the file server "FileServerA".

FIG. 9 is an explanatory diagram showing a result outputted from the file server 0107 of the first embodiment of this invention having sorted the folders contained in the search result with the keyword that appears most often.

To be specific, FIG. 9 is an explanatory diagram for the processing of Step 0710 of FIG. 7.

A sort result 0901 of FIG. 9 shows a total number of search keywords contained in a plurality of files stored in the corresponding folder as a keyword appearance count 0904 for each server name 0902 and folder name 0903.

For example, as shown in FIG. 8, if the files "FileA" and "FileB" that are stored in the folder "DirA" of the file server "FileServerA" store 3 and 2 search keywords, respectively, the sort result 0901 of FIG. 9 indicates the folder "DirA" of the file server "FileServerA" includes the total 5 search keywords.

The above description has been dedicated to the first embodiment of this invention.

Second Embodiment

Hereinafter, description will be made of the file sharing system in cooperation with a search engine according to a second embodiment of this invention with reference to the drawings.

Figure 10:
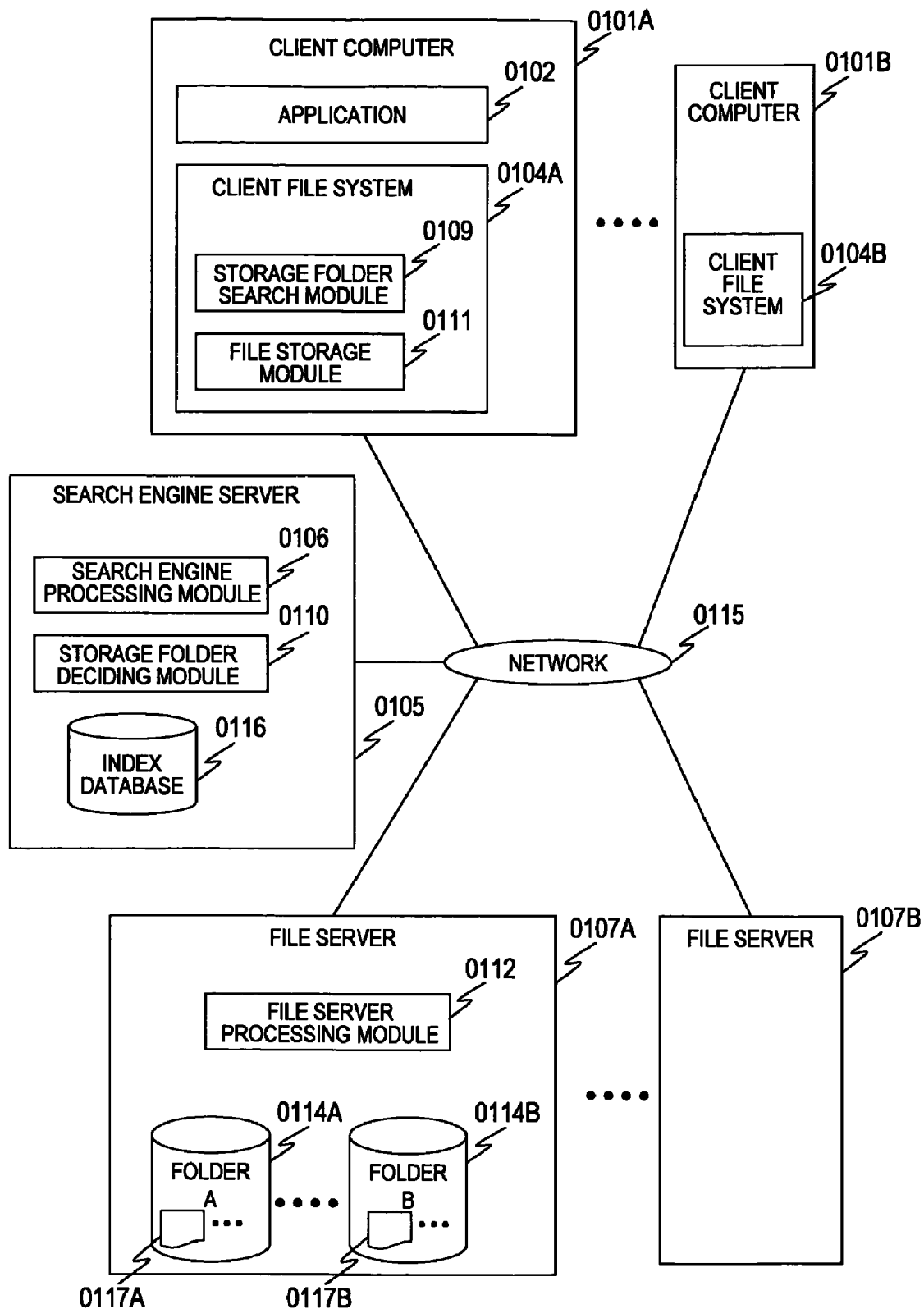
FIG. 10 is a block diagram showing a schematic configuration of a file sharing system in cooperation with a search engine according to a second embodiment of this invention.

FIG. 10 is a block diagram showing a schematic configuration of the file sharing system in cooperation with a search engine according to the second embodiment of this invention.

The following description will be made of points of the file sharing system in cooperation with a search engine according to the second embodiment that are different from that of the first embodiment (refer to FIG. 1).

The storage folder search module 0109 and file storage module 0111 of the second embodiment are included in the client file system 1014A of the client computer 0101A. Accordingly, the processings of the storage folder search module 0109 and the file storage module 0111 are implemented by the CPU 0201 executing programs stored in the memory 0202.

The storage folder deciding module 0110 of the second embodiment is included in the search engine server 0105. Therefore, the processing of the storage folder deciding module 0110 is implemented by the CPU 0301 executing programs stored in the memory 0302.

The computer system of the second embodiment includes a plurality of file servers 0107A and 0107B. FIG. 10 shows only two file servers 0107A and 0107B, but the computer system of this embodiment may include more file servers in actuality. The file server 0107B has the same configuration as the file server 0107A, so its drawing and description will be omitted.

The file server 0107A is different from the file server 0107 of the first embodiment in that the file server 0107A neither includes the file registration module 0108 nor holds the temporary folder 0113. The file server processing module 0112 is the same as that included in the conventional file server. In other words, the conventional file server (in other words, file server mounted with no special function) can be used as the file servers 0107A and 0107B of this embodiment.

Hardware configurations of the client computer 0101, search engine server 0105, and file servers 0107A and 0107B of this embodiment are the same as those of the client computer 0101, search engine server 0105, and file server 0107 of the first embodiment (refer to FIGS. 2 through 4). The index database 0116 of this embodiment is the same as that of the first embodiment (refer to FIG. 5).

The client computer 0101 of this embodiment does not need to include the WWW browser 0103, but needs to include any user interface for registering the file 0117. For example, the client computer 0101 of this embodiment may include the same user interface as shown in FIGS. 6A and 6B.

Figure 11:
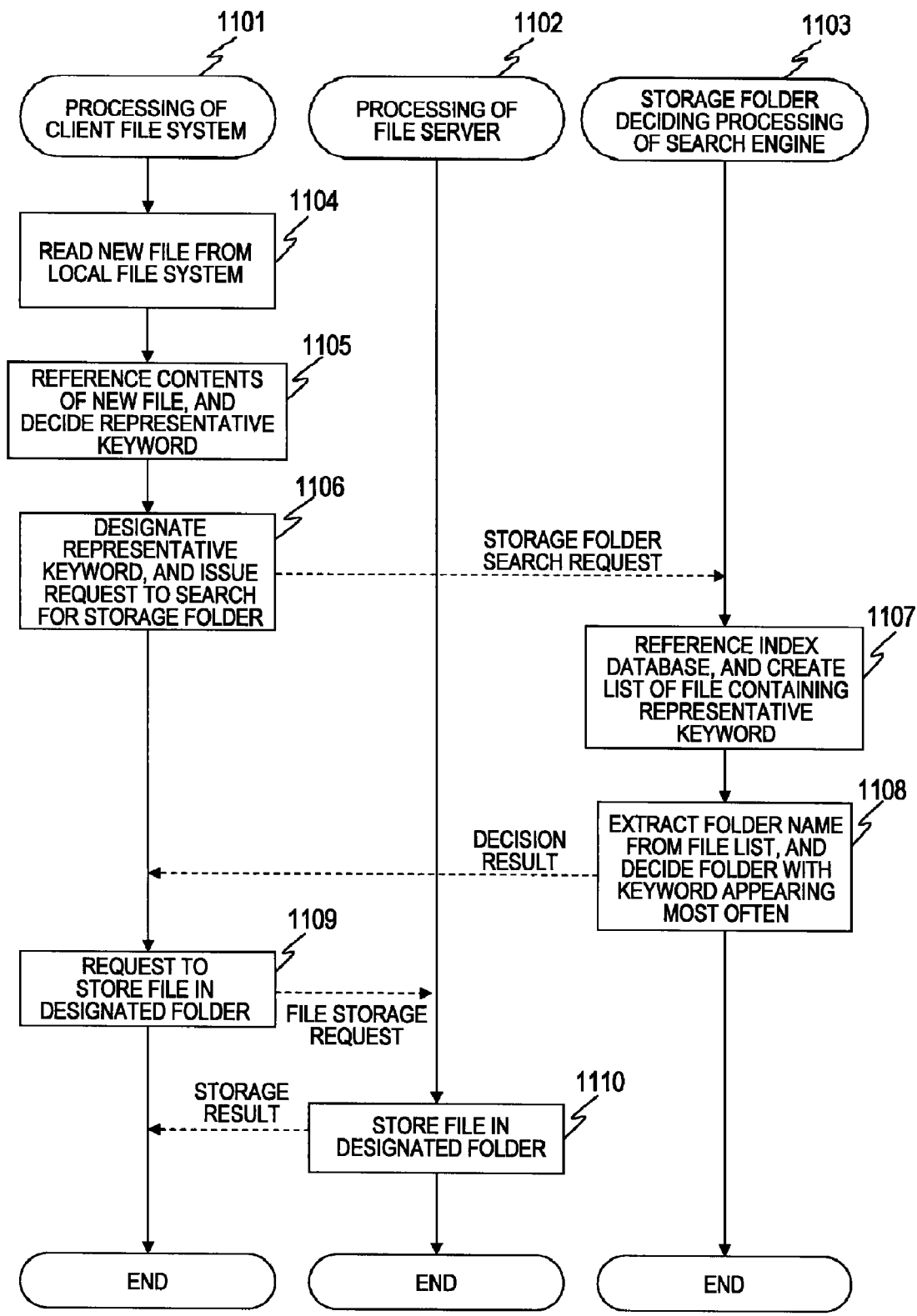
FIG. 11 is a flowchart showing processings executed when a new file is stored in a file server in the second embodiment of this invention.

FIG. 11 is a flowchart showing processings executed when the new file 0117 is stored in the file server 0107A or the like in the second embodiment of this invention.

As shown in FIG. 11, a processing 1101 by the client file system, a processing 1102 by the file server, and a storage folder deciding processing 1103 by the search engine are executed when the new file 0117 is registered in the file server 0107A or the like. Those processings are started by the user inputting an instruction to store the new file 0117 in the file server 0107A or the like with respect to the client file system 0104.

First, the storage folder search module 0109 of the client file system 0104 reads the new file 0117 that is to be stored in the file server 0107A or the like from the local file system of the client computer 0101 (Step 1104).

Then, the storage folder search module 0109 of the client file system 0104 references the contents of the new file 0117 to decide the representative keyword (Step 1105). The way the representative keyword is decided is in conformity to the first embodiment (refer to Step 0707 of FIG. 7).

Subsequently, the storage folder search module 0109 of the client file system 0104 issues a search request for a storage folder with the representative keyword designated as a search key to the search engine server 0105 (Step 1106).

The search engine server 0105, which has received the search request, searches the index database 0116 for the file 0117 containing the representative keyword designated by the search request, and creates a list in which the file 0117 containing the representative keyword and the appearance count of the keyword within the file are contained as each entry (Step 1107). The format of the list is the same as shown in FIG. 8.

Then, the search engine server 0105 extracts the folder name from the file list of the search result, and the folder 0114 having the largest appearance count of the keyword (Step 1108). The deciding method is in conformity to the first embodiment (refer to Step 0710 of FIG. 7). The search engine server 0105 returns the decided folder name to the client computer 0101.

The file storage module 0111 of the client file system 0104, which has received the folder name, issues a request to store the file 0117 in the folder 0114 designated by the received folder name to the file server 0107A or the like (Step 1109).

The file server 0107A or the like, which has received the request, stores the file 0117 in the designated folder 0114 (Step 1110).

After the above-mentioned steps, the processing is completed.

The file sharing system in cooperation with a search engine according to the first embodiment of this invention is implemented by coupling the file server 0107 added with new functions to the conventional client computer 0101 and the conventional search engine server 0105. Meanwhile, the file sharing system in cooperation with a search engine according to the second embodiment of this invention is implemented by coupling the client computer 0101 added with new functions and the search engine server 0105 added with new functions to the conventional file server 0107A or the like.

In either case, even if the user does not designate the storage destination, the file 0117 is stored in the folder 0114 that strongly relates to the file 0117. As a result, it is easy for the user who share the file 0117 to find the file 0117.

The above description has been dedicated to the second embodiment of this invention.

Third Embodiment

Hereinafter, description will be made of the file sharing system in cooperation with a search engine according to a third embodiment of this invention with reference to the drawings.

Figure 12:
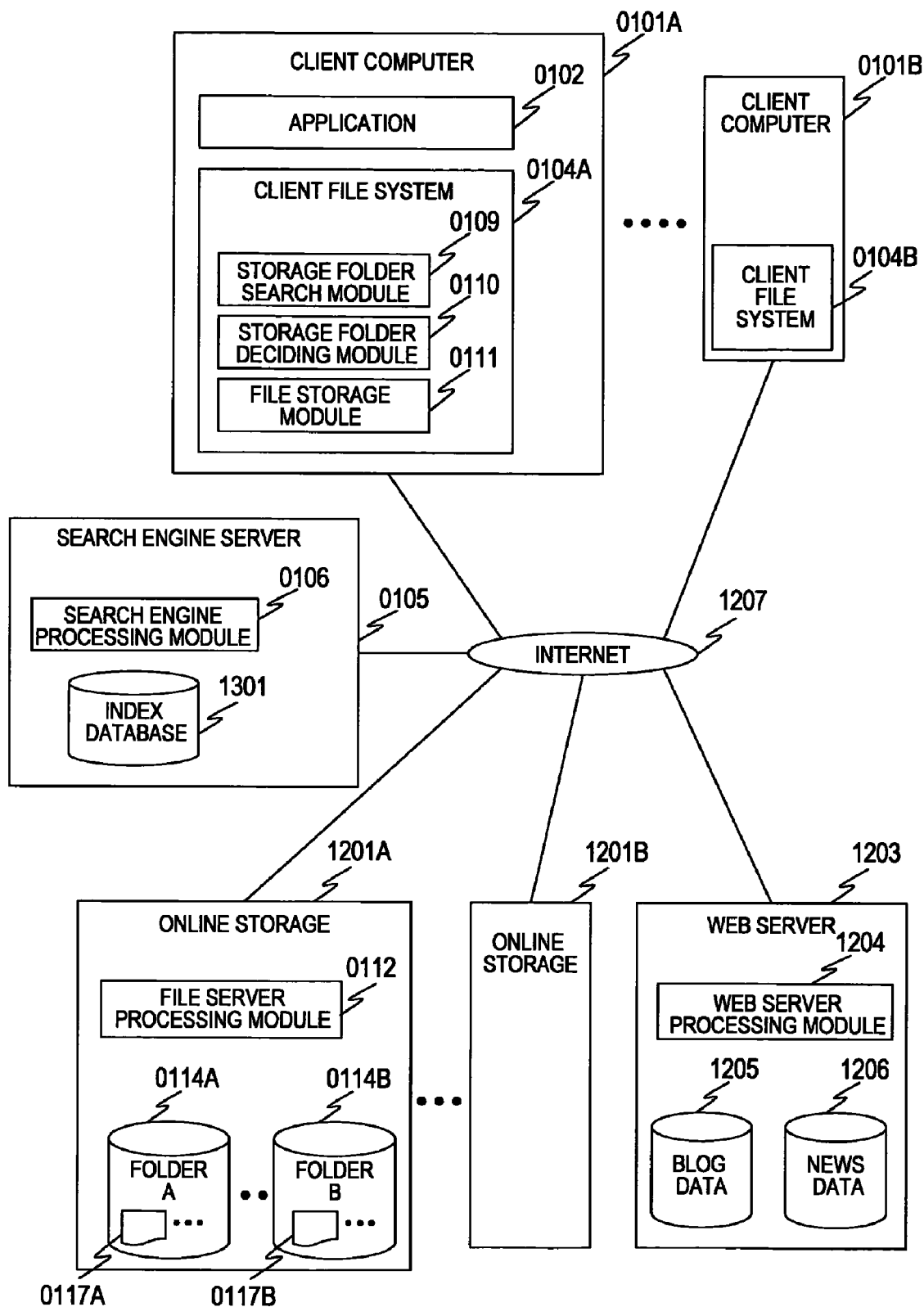
FIG. 12 is a block diagram showing a schematic configuration of a file sharing system in cooperation with a search engine according to a third embodiment of this invention.

FIG. 12 is a block diagram showing a schematic configuration of the file sharing system in cooperation with a search engine according to the third embodiment of this invention.

The following description will be made of points of the file sharing system in cooperation with a search engine according to the third embodiment that are different from that of the first and second embodiments (refer to FIGS. 1 and 10, respectively).

In the third embodiment, for the decision of the folder 0114 that stores the file 0117, reference is made not only to the contents of the file 0117 stored in the folder 0114, but also to end users' evaluations or news articles with respect to the file server. It should be noted that the file server 0107 or the like of the first and second embodiments corresponds to online storages 1201A and 1201B of the third embodiment.

In the third embodiment, the client computers 0101A and 0101B, the search engine server 0105, and the online storages 1201A and 1201B are coupled via the Internet 1207.

The computer system of the third embodiment further includes a Web server 1203 coupled to the Internet 1207. A hardware configuration of the Web server 1203 has the same configuration as the hardware configuration of the search engine server 0105 (FIG. 3). The Web server 1203 includes a Web server processing module 1204, and storages 1205 and 1206 that store Weblog (blog) data and news data, respectively. The Web server 1203 can accumulate information such as blog articles created by the end user and news articles created by the news reporter, and allows the client computers 0101A and 0101B to be accessed via the Internet 1207. The Web server processing module 1204 can be implemented by a technique of mounting a conventional Web server, so its description will be omitted.

The computer system according to the third embodiment includes the online storages 1201A and 1201B instead of the file server. The online storages 1201A and 1201B are the same as the file servers 0107A and 0107B except that the online storages 1201A and 1201B are coupled to the Internet 1207. It should be noted that FIG. 12 shows an example in which the devices are coupled to one another via the Internet 1207, but in actuality, the devices may be coupled to one another via a network (for example, Ethernet) other than the Internet 1207.

In the third embodiment, the storage folder search module 0109, the storage folder deciding module 0110, and the file storage module 0111 are mounted to the client file system 0104A. Thus, the conventional devices can be used without changes for the search engine server 0105, the online storages 1201A and 1201B, and the Web server 1203.

Processings of the storage folder search module 0109, the storage folder deciding module 0110, and the file storage module 0111 are implemented by the CPU 0201 executing the programs stored in the memory 0202.

The search engine server 0105 not only searches the online storages 1201A and 1201B for the file 0117, but also creates an index database 1301 for blogs and news articles within the Web server 1203 and provides a search function.

Figure 13:
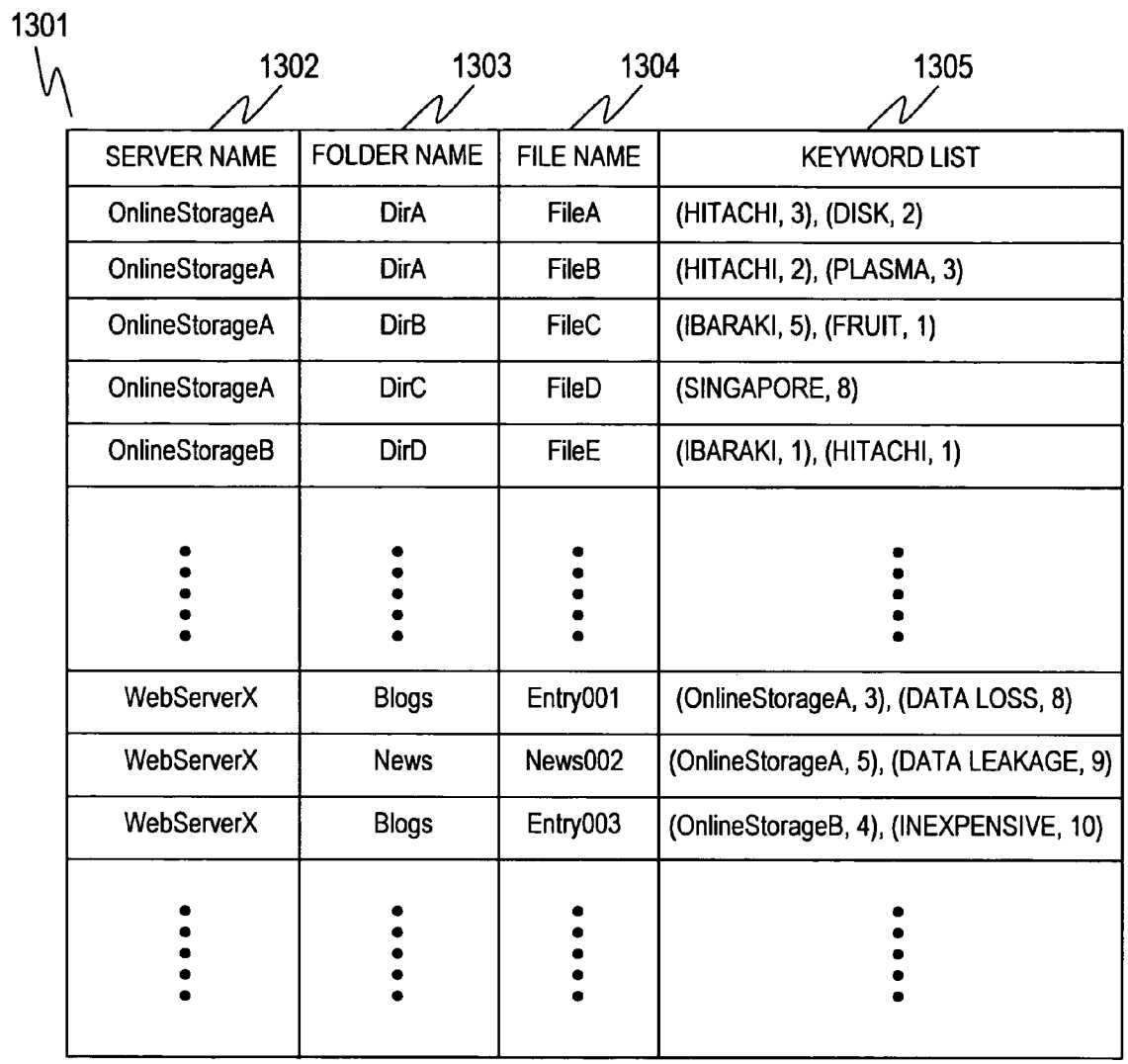
FIG. 13 is an explanatory diagram showing an example of an index database according to the third embodiment of this invention.

FIG. 13 is an explanatory diagram showing an example of the index database 1301 according to the third embodiment of this invention.

A top list (in other words, the first through fifth entries in the example of FIG. 13) of the index database 1301 represents index information on the files 0117 within the online storages 1201A and 1201B. Those entries are similar to those of the first embodiment (refer to FIG. 5).

The rest of the list (in other words, the sixth entry and the subsequent entries in the example of FIG. 13) of the index database 1301 represents index information relating to blogs and news within the Web server 1203. In any of the entries, the index information includes a server name 1302, a folder name 1303, a file name 1304, and a keyword list 1305. Those contents are similar to those of the file server name 0502, folder name 0503, file name 0504, and keyword list 0505 of the first embodiment.

In the case of the index information on blogs and news, in the example of FIG. 13, a file "Entry001" that stores blog data is stored in a directory (folder) "Blogs" of a server "WebServerX". The file "Entry001" contains the keywords "OnlineStorageA" and "data loss" with the keyword appearance count being 3 and 8, respectively.

Figure 14:
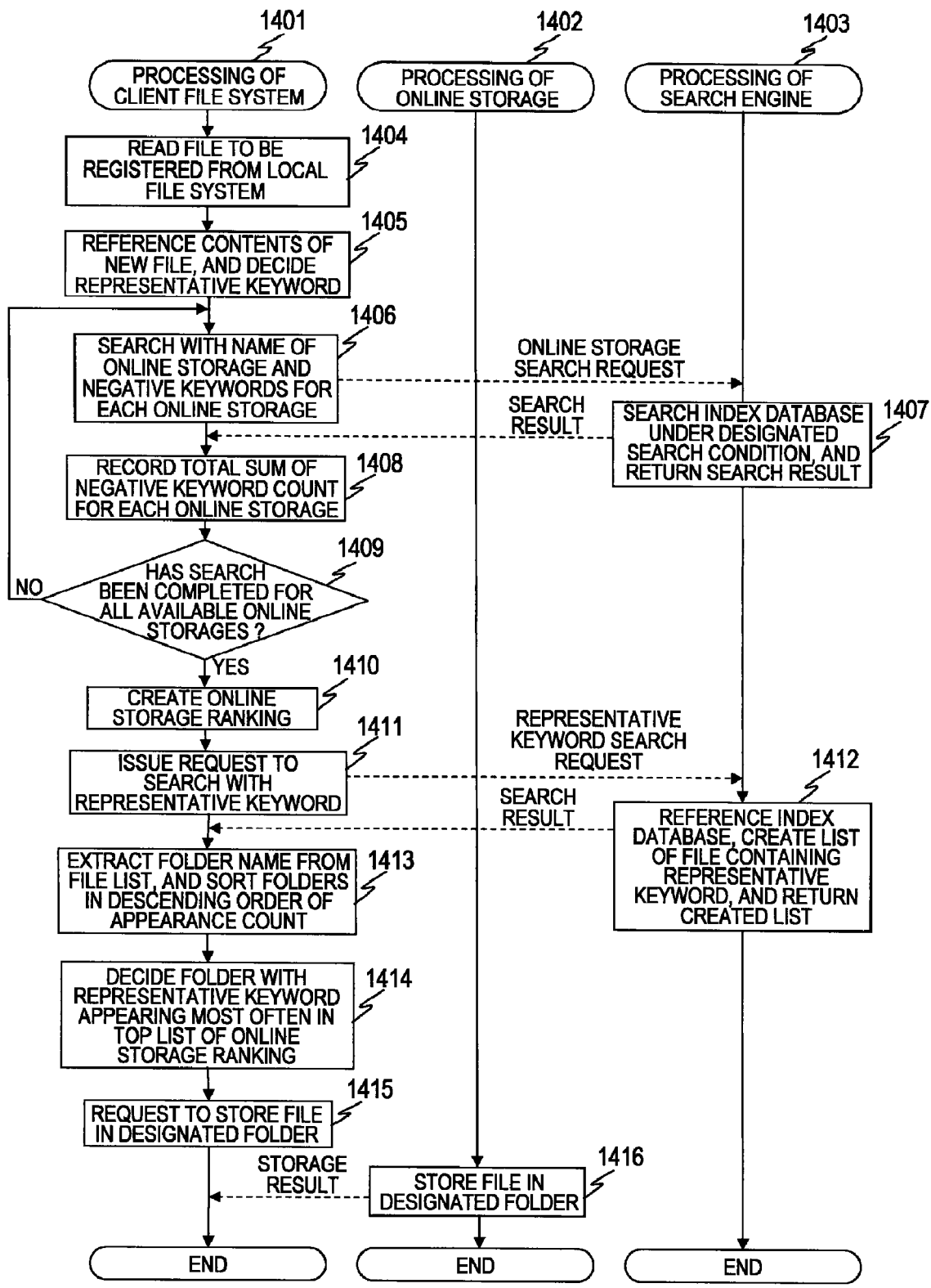
FIG. 14 is a flowchart showing processings executed when a new file is stored in online storages in the third embodiment of this invention.

FIG. 14 is a flowchart showing processings executed when the new file 0117 is stored in the online storages 1201A and 1201B in the third embodiment of this invention.

As shown in FIG. 14, a processing 1401 by the client file system, a processing 1402 by the online storage, and a processing 1403 by the search engine are executed when the new file 0117 is registered in the online storages 1201A and 1201B. Those processings are started by the user inputting an instruction to store the new file 0117 in the online storages 1201A and 1201B with respect to the client file system 0104.

First, the storage folder search module 0109 of the client file system 0104 reads the new file 0117 that is to be stored in the online storages 1201A or the like from the local file system of the client computer 0101 (Step 1404).

Then, the storage folder search module 0109 of the client file system 0104 references the contents of the new file 0117 to decide the representative keyword (Step 1405). The way the representative keyword is decided is in conformity to the first embodiment (refer to Step 0707 of FIG. 7).

Subsequently, for each of the online storage 1201A and the like preregistered by the user, the storage folder search module 0109 of the client file system 0104 designates the name of the online storage 1201A or the like and a keyword (negative keyword) relating to evaluations of the online storage 1201A or the like to issue a search request to the search engine server 0105 (Step 1406). The negative keyword includes, for example, "data loss" and "data leakage". The example of the search request will be described later with reference to FIG. 15.

The search engine server 0105, which has received the search request, searches the index database 1301 with a designated search condition, and returns the search result to the client computer (Step 1407). The example of the search result will be described later with reference to FIG. 16.

The storage folder search module 0109 of the client file system 0104, which has received the search result, calculates a total sum of the negative keyword counts for each of the online storage 1201A and the like (Step 1408). The example of the calculated total sum of the negative keyword counts will be described later with reference to FIG. 17.

Then, the storage folder search module 0109 of the client file system 0104 judges whether or not the search using the negative keyword has been completed for all of the available online storages 1201A and the like (Step 1409). If the search has been completed, the processing advances to Step 1410. If the search has not been completed, the processing returns to Step 1406 to repeat the execution of Steps 1406 through 1409.

Then, the storage folder search module 0109 of the client file system 0104 creates a ranking (i.e., ordered list) of the online storages 1201A and the like by sorting entries contained in the table created in Step 1408 based on the negative keyword count (Step 1410). The online storage 1201A or the like having smaller negative keyword count ranks higher, in other words, is judged to have greater popularity.

Subsequently, the storage folder search module 0109 of the client file system 0104 issues the search request for the storage folder with the representative keyword designated as the search keyword to the search engine server 0105 (Step 1411).

The search engine server 0105, which has received the search request, searches the index database 1301 for the file 0117 that contains the representative keyword designated by the search request, creates a list in which the file 0117 containing the representative keyword and the appearance count of the keyword within the file are contained as each entry, and returns the list to the client file system 0104 (Step 1412).

The storage folder deciding module 0110 of the client file system 0104, which has received the list, extracts the folder name from the file list of the search result, and decides the folder 0114 having the largest appearance count of the keyword (Step 1413). The deciding method is in conformity to the first embodiment (refer to Step 0710 of FIG. 7).

Then, the storage folder deciding module 0110 of the client file system 0104 decides the folder 0114 having the largest appearance count of the representative keyword in the top list (for example, top 5) of the ranking of the online storages 1201A and the like (Step 1414).

After that, the file storage module 0111 of the client file system 0104 issues a request to store the file 0117 in the decided folder 0114 to the online storage 1201A or the like (Step 1415).

The online storage 1201A or the like, which has received the request, stores the file 0117 in the designated folder 0114 (Step 1416).

After the above-mentioned steps, the processing is completed.

FIG. 15 is an explanatory diagram showing an example of a search query 1501 issued in Step 1406 of FIG. 14 to the search engine server 0105 by the storage folder deciding module 0110 of the client file system 0104 according to the third embodiment of this invention.

Requested in the example of FIG. 15 is a search for a list of blogs or news articles that contain the keyword "OnlineStorageA" and also contain at least one of the keywords "data leakage" and "data loss". In this example, "data leakage" and "data loss" correspond to the negative keywords.

FIG. 16 is an explanatory diagram showing an example of a search result 1601 returned in Step 1407 of FIG. 14 to the client file system 0104 from the search engine server 0105 according to the third embodiment of this invention.

The search result 1601 contains a server name 1602, a folder name 1603, a file name 1604, and a keyword count 1605. Those are similar to those of the server name 0802, folder name 0803, file name 0804, and keyword count 0805 of FIG. 8.

The example of FIG. 16 indicates that the file "Entry001" within the folder "Blogs" held by a server "WebserverX" contains 8 negative keywords designated in FIG. 15, and the file "News002" within the folder "News" held by the server "WebserverX" contains 9 negative keywords.

FIG. 17 is an explanatory diagram showing an example of a ranking table 1701 that is created in Step 1408 of FIG. 14, for creating a ranking of popularity of online storages, by the storage folder search module 0109 of the client file system 0104 according to the third embodiment of this invention.

The ranking table 1701 includes a ranking 1702, an online storage name 1703, and a negative keyword count 1704. The online storage name 1703 represents information for identifying the online storage. The negative keyword count 1704 represents a total sum of the keyword counts returned in Step 1406 in the search result. The online storage higher in ranking (in other words, smaller in the negative keyword count) is interpreted as having greater popularity.

FIG. 18 is an explanatory diagram showing an example of a table 1801 for managing the appearance count of a representative keyword for each folder, which is created in Step 1413 of FIG. 14 by the storage folder deciding module 0110 of the client file system 0104 according to the third embodiment of this invention.

The table 1801 of FIG. 18 contains information including an online storage name 1802, a folder name 1803, and a keyword appearance count 1804.

For example, registered in the first entry of FIG. 18 as the online storage name 1802, the folder name 1803, and the keyword appearance count 1804 are "OnlineStorageA", "DirA" and "5", respectively. This indicates that there are the total "5" count of negative keywords contained in all of the files 0117 within the folder "DirA" held by the online storage "OnlineStorageA".

Meanwhile, registered in the second entry of FIG. 18 are "OnlineStorageB", "DirB", and "1", respectively. This indicates that there is the total "1" count of negative keyword contained in all of the files 0117 within the folder "DirB" held by the online storage "OnlineStorageB".

In Step 1414 of FIG. 14, the folder 0114 that stores the file 0117 is decided based on the ranking table 1701 of the online storages shown in FIG. 17 and the folder-basis table 1801 for the representative keyword appearance count shown in FIG. 18. This processing will be described with reference to the examples of FIGS. 17 and 18. If the "top list of ranking" is limited to the first position, the folder "DirB" of the online storage "OnlineStorageB" having the smallest negative keyword count is decided as the folder 0114 that stores the file 0117.

The above description has been dedicated to the third embodiment of this invention.

Various modified examples are possible for the above-mentioned first through third embodiments of this invention. Hereinafter, description will be made of typical modified examples. In the first through third embodiments, only a single folder 0114 that stores the file 0117 is selected (Steps 0710, 1108, and 1414). However, in those steps, a plurality of folders 0114 may be selected. For example, in the list shown in FIG. 9, a plurality of top folders 0114 may be selected. In this case, the file 0117, a copy of the file 0117, or a link to the file 0117 may be stored in the selected plurality of folders 0114. As a result, it becomes more likely that more users can find the file 0117.

The computer systems according to the first through third embodiments include the search engine server 0105. However, if any device within the computer system has a function equivalent to that of the search engine server 0105, the computer system does not need to be separately provided with the search engine server 0105.

Figure 19:
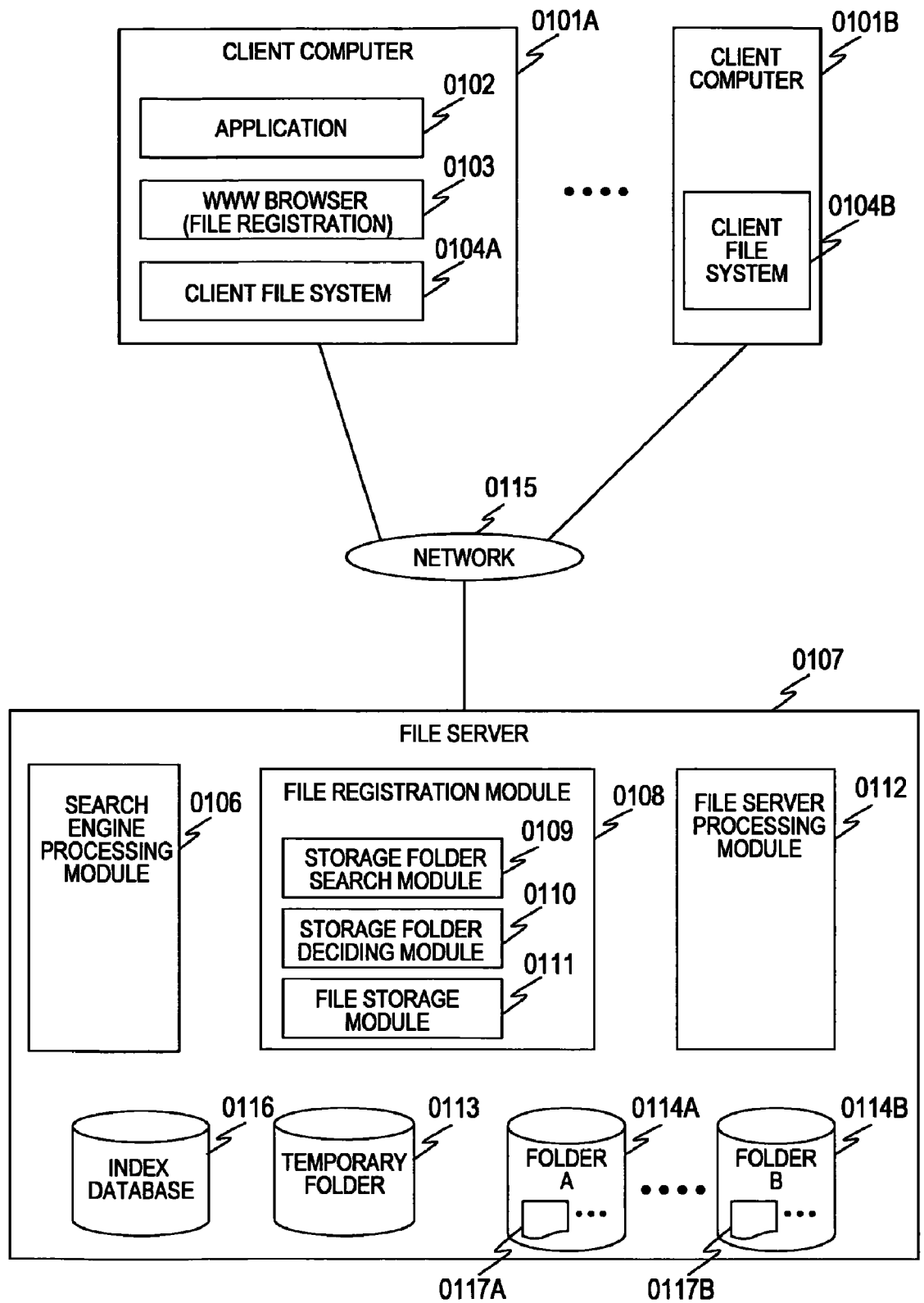
FIG. 19 is a block diagram showing a modified example of the file sharing system in cooperation with the search engine according to the first embodiment of this invention.

FIG. 19 is a block diagram showing a modified example of the file sharing system in cooperation with a search engine according to the first embodiment of this invention.

Hereinafter, description will be made of points of the modified example shown in FIG. 19 which are different from those of the first embodiment shown in FIG. 1.

The computer system shown in FIG. 19 does not include the search engine server 0105. Instead, the file server 0107 includes the search engine processing module 0106 and the index database 0116. In this case, the search engine processing module 0106 may be implemented by a CPU (not shown) within the controller 0402 executing programs stored in a memory (not shown) within the controller 0402. The index database 0116 may be stored within the HDD 0406 or the like.

The processings shown in FIG. 7 are also executed in the computer system shown in FIG. 19. However, the search processing 0703 by the search engine is executed by the search engine processing module 0106 within the file server 0107.

According to the above embodiments of this invention, the newly created file can be stored in a folder that stores as many files having similar contents to those of the newly created file as possible. This eliminates from the user who creates a file the time and labor of selecting a folder to store the file or searching for files.

Further, the user can execute a normal file operation. In other words, if the user knows which folder is suitable for storing the newly created file, the user can also store the newly created file in the suitable folder. Accordingly, the user can find the newly stored file without taking time and labor for a search.

Further, according to the embodiments of this invention, a similarity (in other words, matching degree) of files is judged based on the representative keyword of the newly created file and the keyword contained in the file, and the folder into which the newly created file is to be stored is selected based on the similarity. For example, the folder including the largest number of files that contain the representative keyword may be selected. Accordingly, it is possible to select the suitable folder as the storage destination of the newly created file.

Alternatively, the folder having the largest total appearance count of the representative keyword may be selected. Accordingly, even if the folder includes a small number of files, the folder having a large count of the representative keyword contained in the files is selected as the storage destination, which improves the efficiency of finding a suitable file.

The matching degree of files that are strongly related to each other (for example, document files related to the same work) is generally assumed to be high. According to the above embodiments of this invention, the files that are strongly related to each other are stored in a single folder, the users sharing files can easily find a desired file.

Further, according to the embodiments of this invention, the keyword whose appearance count is the largest in the newly created file may be used as the representative keyword. Accordingly, it is possible to select the representative keyword that describes the contents of the file most accurately, and store the file in the folder most suitable for the contents of the file.

Alternatively, according to the embodiments of this invention, the user may designate an arbitrary representative keyword. This allows classification of folders which reflects the intent of the user.

If the file server is mounted with the storage folder search module, the storage folder deciding module, and the file storage module, this invention can be carried out by use of the conventional client computer.

Further, if the file server is further mounted with the search engine processing module, the search engine server can be omitted from the system.

If the search engine server is mounted with the search engine processing module and the storage folder deciding module, and if the client computer is mounted with the storage folder search module and the file storage module, this invention can be carried out by use of the conventional file server. In addition, even if the system has such a large scale as to include a plurality of file servers, it is possible, by being thus mounted, to decide the file server and folder suitable for storing the file.

If the search engine server is mounted with the search engine processing module, and if the client computer is mounted with the storage folder search module, the storage folder deciding module, and the file storage module, this invention can be carried out by use of the conventional search engine server and the conventional file server.

Further, according to the embodiments of this invention, the file storage destination can also be selected based on the search result of articles published on the Web server. As a result, when a file is to be stored in the online storage services available particularly via the Internet which are provided by a plurality of different service providers, the file can be safely stored in the online storage service that is the most popular among users even if the user does not designate the storage destination.

In the online storage service that is the most popular among users, an accident such as data loss is assumed to be unlikely to happen, and the number of users of the online storage service is also assumed to be large. Accordingly, storing a file in the online storage service that is the most popular among users contributes to the improvement of ease of finding the file by users sharing the file.

The evaluations of the online storage service and news on the data loss and other such accidents are made public on a blog server or a Web server, and can be retrieved by the search engine for Web pages.

By storing the newly created file, its copy, or the like in the plurality of folders that are assumed to be strongly related to the newly created file, it becomes more likely that more users can find the file.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
a client computer configured to receive an instruction to store a file, the client computer including:
a first interface coupled to a network,
a first processor coupled to the first interface, and
a first memory coupled to the first processor; a first storage system coupled to the client computer via the network, the first storage system including:
at least one first data storage device including a plurality of data storage areas, wherein at least one of the data storage areas is associated with one of a plurality of files, and each of the plurality of files is stored in one of a plurality of folders, and
a first controller for controlling the first data storage device;
a folder deciding module configured to judge how strongly the plurality of folders are each related to the file designated to be stored by the instruction based on a matching degree between each of the plurality of files stored in the plurality of folders and the designated file;
a search processing module configured to compare a representative keyword set for the designated file with keywords contained in the files within the plurality of folders to obtain an appearance count of the representative keyword that appears in the files within the plurality of folders; and
a file storage module configured to store the designated file in one of the plurality of folders that has been judged to be most strongly related to the designated file, wherein the folder deciding module is configured to judge how strongly the plurality of folders are each related to the designated file by using the appearance count of the representative keyword as the matching degree.

2. The computer system according to claim 1, wherein the folder deciding module is further configured to: calculate the number of files that have the appearance count of the representative keyword being one or more among the files stored in the plurality of folders, for each folder; and judge that the folder with the calculated number of files being larger is related to the designated file more strongly.

3. The computer system according to claim 1, wherein the folder deciding module is configured to: sum up the appearance count of the representative keyword that appears in the files stored in the plurality of folders, for each folder; and judge that the folder with the summed up appearance count of the representative keyword being larger is related to the designated file more strongly.

4. The computer system according to claim 1, wherein the representative keyword represents a keyword having a largest appearance count within the designated file, among keywords contained in the designated file.

5. The computer system according to claim 1, wherein the representative keyword represents a keyword entered through the client computer.

6. The computer system according to claim 1, further comprising a search computer coupled to the network,
the search computer including:
a second interface coupled to the network;
a second processor coupled to the second interface; and
a second memory coupled to the second processor,
wherein:
the search processing module is implemented by the second processor executing a program stored in the second memory;
the folder deciding module and the file storage module are implemented by the first controller executing a predetermined program;
at least one of the plurality of data storage areas is associated with a file within a temporary folder;
the client computer is configured to transmit, upon reception of the instruction to store the designated file, the instruction to store the designated file to the first storage system; and
the file storage module is configured to:
store the designated file in the temporary folder; and
read out the designated file from the temporary folder after the folder deciding module judges how strongly the plurality of folders are each related to the designated file, and store the designated file in the folder that has been judged to relate to the designated file most strongly.

7. The computer system according to claim 1, wherein:
the search processing module, the folder deciding module, and the file storage module are implemented by the first controller executing a predetermined program;
at least one of the plurality of data storage areas is associated with a file within a temporary folder;
the client computer is configured to transmit, upon reception of the instruction to store the designated file, the instruction to store the designated file to the first storage system; and
the file storage module is configured to:
store the designated file in the temporary folder; and
read out the designated file from the temporary folder after the folder deciding module judges how strongly the plurality of folders are each related to the designated file, and store the designated file in the folder that has been judged to relate to the designated file most strongly.

8. The computer system according to claim 1, further comprising a search computer coupled to the network,
the search computer including: a second interface coupled to the network;
a second processor coupled to the second interface; and
a second memory coupled to the second processor,
wherein:
the search processing module and the folder deciding module are implemented by the second processor executing a program stored in the second memory;
the file storage module is implemented by the first processor executing a program stored in the first memory;
the client computer is configured to transmit, upon reception of the instruction to store the designated file, a search request containing the representative keyword set for the designated file to the search computer;
the search computer is configured to transmit identification information of the folder judged to relate to the designated file most strongly to the client computer; and
the file storage module is configured to transmit an instruction to store the designated file in the folder identified by the received identification information to the first storage system.

9. The computer system according to claim 1, further comprising at least one second storage system coupled to the network,
the at least one second storage system each including:
at least one second data storage device; and
a second controller for controlling the second data storage device, at least one of the plurality of data storage areas included in the at least one second data storage device being associated with one of the plurality of files,
wherein:
the search processing module is configured to compare a representative keyword set for the designated file with keywords contained in the files within the plurality of folders to thereby obtain an appearance count of the representative keyword that appears in the files within the plurality of folders included in the first storage system and the at least one second storage system; and
the folder deciding module is configured to judge how strongly the plurality of folders included in the first storage system and the at least one second storage system are each related to the designated file by using the appearance count of the representative keyword as the matching degree.

10. The computer system according to claim 1, further comprising a search computer coupled to the network,
the search computer including:
a second interface coupled to the network;
a second processor coupled to the second interface; and
a second memory coupled to the second processor,
wherein:
the search processing module is implemented by the second processor executing a program stored in the second memory;
the folder deciding module and the file storage module are implemented by the first processor executing a program stored in the first memory;
the client computer is configured to transmit, upon reception of the instruction to store the designated file, a search request containing the representative keyword set for the designated file to the search computer;
the search computer is configured to transmit a list including identification information of files that have the appearance count of the representative keyword being one or more among the files stored in the plurality of folders, to the client computer; and
the file storage module is configured to transmit an instruction to store the designated file in the folder judged to relate to the designated file most strongly among the plurality of folders, to the first storage system.

11. The computer system according to claim 10, further comprising:
at least one second storage system coupled to the network; and
a server computer coupled to the network,
the at least one second storage system each comprising:
at least one second data storage device; and
a second controller for controlling the second data storage device,
at least one of the plurality of data storage areas included in the at least one second data storage device being associated with one of the plurality of files, the server computer comprising:
a third interface coupled to the network;
a third processor coupled to the third interface;
a third memory coupled to the third processor; and
a third data storage device coupled to the third processor, the third data storage device having at least one second file stored therein, wherein:
the search processing module is configured to search the at least one second file for the second file containing: identification information of one of the first storage system and any one of the at least one second storage system; and a predetermined keyword; and
the folder deciding module is configured to:
sum up the count of the predetermined keyword contained in the second file obtained through the search, for each identification information of the first storage system and the second storage system contained in the obtained second file; and
judge how strongly the plurality of folders included in each one of the first storage system and any one of the at least one second storage system in which the summed up count of the predetermined keyword satisfies a predetermined condition are related to the designated file.

12. The computer system according to claim 1, wherein the file storage module stores one of the designated file, a copy of the designated file, or a link to the designated file in each of at least one folder that has been judged to have a stronger relationship with the designated file than a predetermined threshold among the plurality of folders.

13. The computer system according to claim 1, wherein:
the client computer is coupled with a display device; and
the client computer causes the display device to display the identification information of the folder that has been judged to relate to the designated file most strongly among the plurality of folders.

14. A method of controlling a computer system, the computer system including:
a client computer, including:
a first interface coupled to a network,
a first processor coupled to the first interface,
a first memory coupled to the first processor; and
a first storage system coupled to the client computer via the network, the first storage system including:
at least one first data storage device including a plurality of data storage areas, wherein at least one of the data storage areas is associated with one of a plurality of files, and each of the plurality of files is stored in one of a plurality of folders, and a first controller for controlling the first data storage device;

the method comprising the steps of:

receiving an instruction to store a file;

judging how strongly the plurality of folders are each related to the file designated to be stored by the instruction based on a matching degree between each of the plurality of files stored in the plurality of folders and the designated file;

storing the designated file in one of the plurality of folders that has been judged to be most strongly related to the designated file; and comparing a representative keyword set for the designated file with keywords contained in the files within the plurality of folders to thereby obtain an appearance count of the representative keyword that appears in the files within the plurality of folders, wherein, in the step of judging how strongly the plurality of folders are related to the designated file, the appearance count of the representative keyword is used as the matching degree.

15. The method according to claim 14, wherein the step of judging how strongly the plurality of folders are related to the designated file includes the steps of:

calculating the number of files with the appearance count of the representative keyword being one or more among the files stored in the plurality of folders, for each of the folders; and judging that the folder with the larger number of files that has been calculated is related to the designated file more strongly.

16. The method according to claim 14, wherein the step of judging how strongly the plurality of folders are related to the designated file includes the steps of:

summing up the appearance count of the representative keyword that appears in the files stored in the plurality of folders, for each folder; and judging that the folder with the summed up appearance count of the representative keyword being larger is related to the designated file more strongly.

17. The method according to claim 14, wherein the representative keyword represents a keyword having a largest appearance count within the designated file, among keywords contained in the designated file.

18. The method according to claim 14, wherein: the computer system further includes:

at least one second storage system coupled to the network; and a server computer coupled to the network;

the at least one second storage system each includes:

at least one second data storage device; and a second controller for controlling the second data storage device;

at least one of the plurality of data storage areas included in the at least one second data storage device is associated with one of the plurality of files;

the server computer includes:

a second interface coupled to the network;

a second processor coupled to the second interface;

a second memory coupled to the second processor; and a second data storage device coupled to the second processor;

the second data storage device has at least one second file stored therein;

the method further comprises the steps of:

searching the at least one second file for the second file containing: identification information of one of the first storage system and any one of the at least one second storage system; and a predetermined keyword; and summing up the count of the predetermined keyword contained in the second file obtained through the search, for each identification information of the first storage system and the second storage system contained in the obtained second file; and the step of judging how strongly the plurality of folders are related to the designated file further includes the step of judging how strongly the plurality of folders included in each one of the first storage system and any one of the at least one second storage system in which the summed up count of the predetermined keyword satisfies a predetermined condition are related to the designated file.

* * * * *

UNITED STATES PATENT AND TRADEMARK OFFICE
CERTIFICATE OF CORRECTION

| | | |
|---|---|---|
| PATENT NO. | : 7,865,476 B2 | |
| APPLICATION NO. | : 12/068091 | |
| DATED | : January 4, 2011 | |
| INVENTOR(S) | : Shoji Kodama | |

It is certified that error appears in the above-identified patent and that said Letters Patent is hereby corrected as shown below:

ON THE TITLE PAGE:

At Section (*) Notice: insert --This patent is subject to a terminal disclaimer.--

Signed and Sealed this
Ninth Day of August, 2011

David J. Kappos
*Director of the United States Patent and Trademark Office*